G. A. LANE.
PIPE TONGS.
APPLICATION FILED FEB. 21, 1910.

963,903.  Patented July 12, 1910.

Witnesses.
E. R. Pollard
F. D. Ammen

Inventor.
George A. Lane.
by Howard & Strauss
Attys.

UNITED STATES PATENT OFFICE.

GEORGE A. LANE, OF FLORENCE, CALIFORNIA, ASSIGNOR OF ONE-HALF TO EDWARD C. KELLERMEYER, OF TAFT, CALIFORNIA.

PIPE-TONGS.

963,903.  Specification of Letters Patent.  Patented July 12, 1910.

Application filed February 21, 1910. Serial No. 545,013.

*To all whom it may concern:*

Be it known that I, GEORGE ALLEN LANE, a citizen of the United States, residing at Florence, in the county of Los Angeles and State of California, have invented new and useful Improvements in Pipe-Tongs, of which the following is a specification.

This invention relates to pipe tongs such as used for gripping pipes in order to couple sections of pipe together. Tongs of this kind are largely used in the construction of deep wells, but the device may be used by pipe fitters if desired for fitting pipes of smaller diameter.

Figure 1:
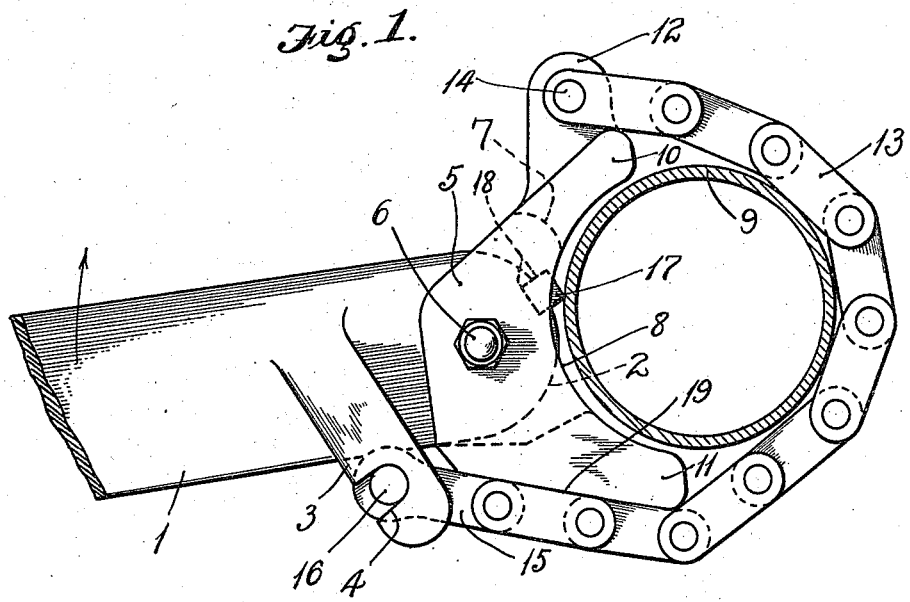
Figure 2:
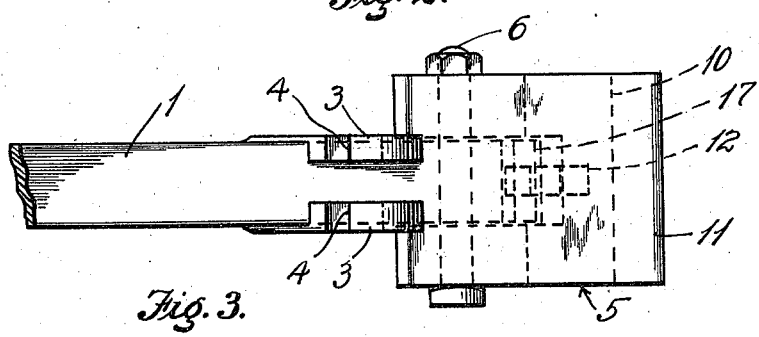
Figure 3:
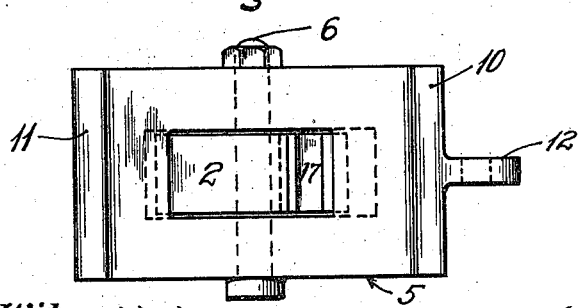

In the annexed drawing which fully illustrates my invention, Figure 1 is a plan of the device illustrating the same in operation, the pipe being shown in cross section and the lever of the device being broken away. Fig. 2 is a side elevation of the device, representing the same as removed from the pipe, and with the lever broken away. Fig. 3 is an end view showing the inner end of the lever and showing the inner face of the shoe which rests against the side of the pipe.

Referring more particularly to the parts, 1 represents the lever, the inner end of which is formed with a rounded nose 2, and near this point the lever is formed with a pair of laterally projecting inclined arms 3, said arms being provided with alining notches 4, for a purpose which will appear more fully hereinafter. On the end of the lever beyond these arms 3, a shoe 5 is pivotally attached on a pivot pin or bolt 6. The middle portion of this shoe is cut away so as to form an opening or socket 7, which receives the end of the lever, as indicated. On its inner side the shoe presents a concave face 8, which has an arcuate curve corresponding to the diameter of the pipe 9 to which the device is to be applied, so that it presents extensions or short legs 11 which diverge from each other and lie close to the sides of the pipe, as will be readily understood. The leg 10 is provided with a lug 12 and to this lug a chain 13 is attached which chain is formed of links pivoted together, as indicated. The chain 13 is permanently attached to the lug 12 by a pivot bolt 14. At the other end of the chain 13, the extreme end link 15 is provided with a fixed cross pin 16, the ends of which project at each end of the link so that this cross pin or stud 16 can be hooked into the notches 4, as indicated in Fig. 1. On the inner end of the lever 1 a bit or tooth 17 is attached, said bit being inserted in the socket 18 formed in the end of the lever, as shown. This bit is in the form of a hardened steel bar, it presents a corner or edge which projects beyond the face 8 in such a way that it will bite into the face of the pipe when the tongs are applied, as shown in Fig. 1.

In using the device, the lever 1 is moved in the direction of the arrow, and this takes up the slack on the chain 13 and clamps the sides of the links against the side of the pipe, as will be readily understood. The bit 17 effectually prevents the lever from slipping circumferentially on the side of the pipe.

The chain near the arm 3 lies against the outer face 19 of the leg 11 so that the tension in the chain results in pulling the shoe firmly against the side of the pipe.

Special attention is called to the feature of mounting the shoe pivotally on the lever. This gives the device efficiency and tends to equalize the pull of the chain on each side of the shoe. The pull of the chain applied to the shoe of course presses the bit 17 against the side of the pipe with great force.

Attention is called to the fact that the bit 17 is disposed to one side of the line joining the axis of the pipe with the axis of the pivot bolt 6 and on the side of that line toward which the lever 1 is moved when the tongs are being operated. This arrangement makes the bit bite into the side of the pipe when force is applied to the lever in the direction indicated by the arrow in Fig. 1, and furthermore, when the lever is moved in the opposite direction, to take a new grip upon the pipe, the bit 17 withdraws itself from the surface of the pipe and this saves the bit from considerable wear on the backward movements of the tongs.

Having described my invention, what I claim as new and desire to secure by Letters Patent, is:

1. Pipe tongs comprising a lever, a shoe having a concave face adapted to fit against the side of the pipe, a bit set in the end of said lever adapted to bite the side of the pipe, and a chain attached to said shoe at one end and attached to said lever at the other end and passing around the pipe.

2. Pipe tongs comprising a lever, a shoe having a socket receiving said lever and adapted to fit against the side of the pipe, a bit mounted in the inner end of said lever adjacent to the pipe, a chain pivotally attached to said shoe at one side thereof adapted to pass around the pipe, and means for removably securing the other end of said chain to the lever at a point removed from the pivot point of said shoe.

3. Pipe tongs comprising a lever, a shoe, pivoted thereto, a lever adapted to fit against the side of a pipe, a chain attached to said shoe at one end and attached to said lever at the other end and passing around the pipe, and a bit set in the end of said lever, and disposed to one side of the line adjoining the pivot connection of said lever with said shoe, and the axis of the pipe, and disposed on the side of said line toward which the said lever is moved in tightening the tongs.

In witness that I claim the foregoing I have hereunto subscribed my name this 12th day of February, 1910.

G. A. LANE.

Witnesses:
EDMUND A. STRAUSE,
ETHEL COLEMAN.